No. 861,857. PATENTED JULY 30, 1907.
P. JANSEN.
MACHINE FOR TOPPING ONIONS.
APPLICATION FILED MAR. 13, 1907.
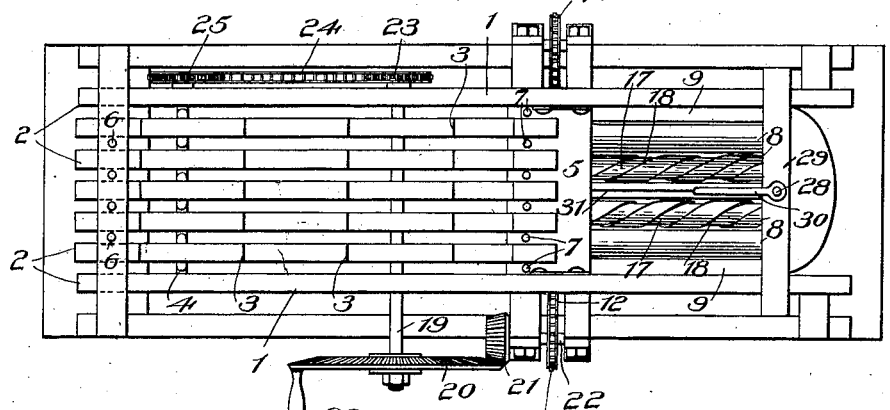
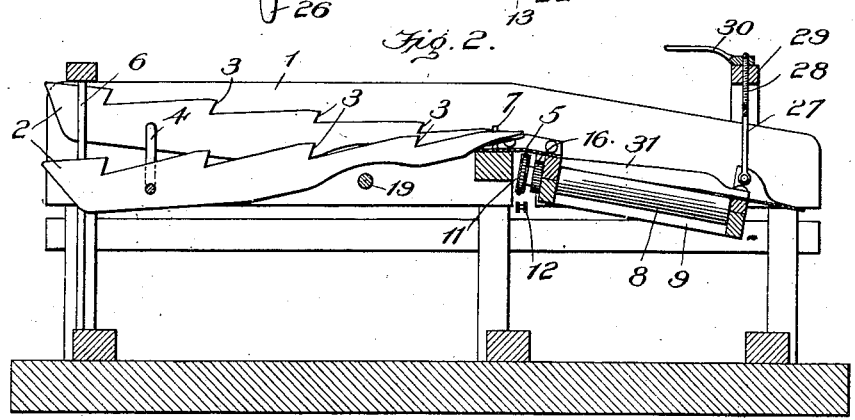
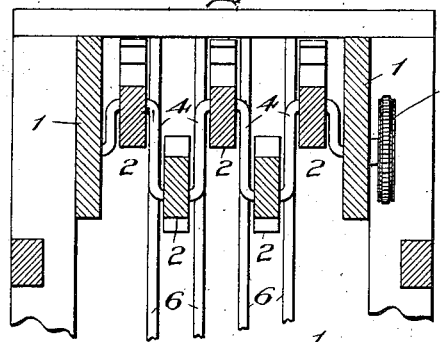
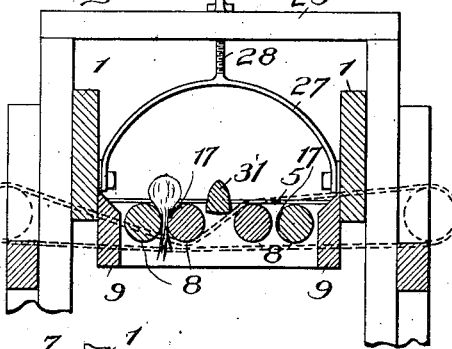
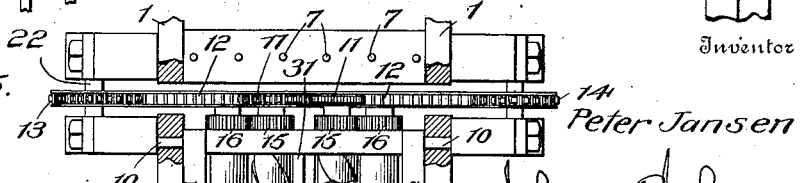
Witnesses
Edwin L. Bradford
Anne B. Johnson
Inventor
Peter Jansen
By Johnson & Johnson
Attorneys

UNITED STATES PATENT OFFICE.

PETER JANSEN, OF GRIFFITH, INDIANA.

MACHINE FOR TOPPING ONIONS.

No. 861,857.

Specification of Letters Patent.

Patented July 30, 1907.

Application filed March 13, 1907. Serial No. 362,112.

*To all whom it may concern:*

Be it known that I, PETER JANSEN, a citizen of the United States, residing at Griffith, in the county of Lake and State of Indiana, have invented certain new and useful Improvements in Machines for Topping Onions; and I do hereby declare the following to be a full, clear, and exact description of the invention, such as will enable others skilled in the art to which it appertains to make and use the same.
For rendering onions marketable I have produced a machine for cleaning and removing the tops therefrom and in which the operation of cleaning and topping are rendered continuous under the action of agitating reciprocating bars and spirally grooved and non grooved pairs of topping rolls and in the claims appended hereto and in connection with the accompanying drawings I will specifically set out the parts and combinations of parts which constitute my invention.
Referring to these drawings: Figure 1 represents in top view an onion topping machine embracing my improvements. Fig. 2 is a vertical longitudinal section of the same. Fig. 3 is a transverse section taken through the topping rolls. Fig. 4 is a transverse section taken through the cleaning and feeding bars. Fig. 5 shows in top view the operating connections for the topping rolls.

The operating parts of the machine are mounted in a suitable frame in which a pair of horizontal parallel long side boards 1, 1, fixed to posts form the housing for the operating parts which are arranged in two sections one in advance of the other between the side boards. The advance or initial section is for receiving the onions and shaking, cleaning, and feeding them forward, and the terminal or delivery section is for receiving the cleaned onions and pulling off their tops, the operations being successive and continuous. The shaking, cleaning and feeding section is formed by a plurality of bars 2, each having its upper edge stepped whereby shoulders 3, having their vertical walls standing forward serve, under a longitudinal movement of the bars, to feed the onions forward upon the bars in the manner of a shaking platform feed. Spaces separate the bars for escape of the dirt which is shaken and rubbed from the onions by the agitation they receive from the vertical and lengthwise movements of the bars. For this purpose the bars are pivotally mounted on a crank shaft 4, so that under the rotation of the shaft, they will be caused to rise and fall alternately at their crank connected ends only while they are longitudinally reciprocated, assuming in their advance movements practically horizontal positions. For this purpose the forward ends of the bars are unattached and rest and slide upon a plate 5, which overhangs the topping section. For causing the bars to move in regular paths their crank mounted ends are movable between vertical rods 6, at the end of the frame and their delivery ends are movable between short studs or pins 7, at the plate upon which they slide.

The topping section comprises a plurality of rolls 8 which incline downward from the overhanging plate and are rotated in pairs in opposite directions. I prefer to mount these rolls in a separate frame 9, pivoted at 10, at its inner end beneath the overhanging plate 5 and suspended at its lower end by means whereby the inclination of the rolls may be adjusted to suit the work. The central pair of rolls are each at their inner ends provided with a sprocket pulley 11, 11, and are driven by a sprocket chain 12, from a driven sprocket pulley 13, mounted at one side of the frame and passing over a loose sprocket pulley 14, at the other side of the frame, the chain on its mountings passing over the sprocket pulley of one of said central pair of rolls and engaging the sprocket pulley of the other roll of the central pair, whereby these central pair of rolls are caused to rotate in opposite directions. The sprocket pulley of each of the central pair of rolls has a pinion 15, which engages with a pinion 16, on a roll which co-acts with and forms a pair with each roll of the central pair, so that the pair of geared rolls will be caused to rotate in opposite directions. To render this topping of the onions effective I find that providing one of each driven pair of rolls with a shallow spiral groove 17 and the other roll of the pair non grooved, will cause the tops to be drawn down between the rolls and that spiral edge of the groove which rotates toward the contiguous ungrooved roll, to engage and sever the top. In this the ungrooved roll surface co-acts with the groove to draw the onion top down into the groove and to aid in pulling it off, while the onions are supported upon the smooth surface of the rolls and are prevented thereby from being bruised, by its downward travel over and by their rotation.

By arranging the roll carrying frame within the fixed frame sides, not only renders it convenient to adjust the inclination of the rolls within said frame sides but renders it advantageous to operate the rolls at the pivoted end of their mounting frame and therefore not interfering with the operating connections in the adjustment of the roll frame. Another advantage in the transverse connections for operating the rolls is that it allows the crank shaft of the shouldered cleaning and feeding bars to be operated by the same connections which operate the topping rolls. For this purpose a shaft 19, mounted transversely in the frame sides, has a bevel gear 20, which engages a bevel pinion 21, on the shaft 22, on which the chain driven sprocket pulley is fixed; while a sprocket pulley 23, on the other end of said transverse shaft, engages by a sprocket chain 24, a sprocket-pulley 25, on the end of the crank-shaft. The transverse shaft may be driven by power or by a hand crank 26, on the gear wheel. The cranks of the shouldered feed bars, are of sufficient stroke to give them considerable throw and thereby cause the onions to be subjected to violent jumping movements about the crank mounted ends of the bars, and it will be noted that this jumping movement decreases toward their delivering ends, and which by their sliding movements push the onions off the fixed plate which overhangs the rolls. The space between the pairs of rolls is sufficient to cause them, by their rotation, to pull the tops between them into the grooves, the edges of which will act to pull off the tops; and it is important to note that this pulling off function is caused by the action of the pair of rolls one of which has an unbroken surface while the other has spiral grooves.

It will be understood that the onions are cleaned and topped when in the condition best suited for preparing them for the market and that the action of the spiral groove and that of one of its spiral edges, serve in connection with the ungrooved roll to effect the topping without pulling the stem completely out of the body of the onion; that so easy and expeditiously does the machine do the work that two men can clean and top as many onions in two hours as four men can do by hand in a day; that the length of a full size machine is about eight feet; the rolls being about twenty four inches long and the feeding bars about six feet long, so that the onions will be caused in their movement over the bars to be shaken up against one another and upon the bars and to pass therefrom and drop upon the rolls and by them subjected to the topping operation. It will also be noted that the revolution of the crank shaft will cause the ends of the bars connected to the cranks to have up and down jerky movements, whereby the onions are very thoroughly jolted and rubbed together by each up and down jolting and that the feed of the onions is effected by the shoulders of the bars on their forward movements and so far as I know and can find the combination of means for cleaning, feeding and topping onions by a continuous operation of such means, is a new feature in a machine for preparing onions for the market.

As the inclination of the rolls governs the feed of the onions thereon I provide means for adjusting such inclination, and which as shown consists of a bale or yoke 27, centrally suspended by a screw stem 28, from a top cross bar 29, at the delivery end of the rolls, the ends of the bale being connected to each side of the roll carrying frame and a handled nut 30, engaging the screw stem on top of the bar and it is the turning of this nut which raises and lowers the delivering end of the pivotally mounted roller-frame.

The side boards of the frame form a continuous hopper for the feed of the onions; and a central divider 31, prevents the onions from passing down between the central pair of rolls which rotate upward and therefore are not adapted to draw the onion tops between them.

The advantage of providing the topping rolls with shallow spiral grooves, is that each groove provides two spiral edges each of which as the rolls revolve serves to draw the tops into the grooves and assist the non grooved roll in pulling off the tops and for this purpose I prefer to make the spiral grooves of greater width than depth so that each groove will form a pair of surface edges which co-act with the non grooved roll to pull off the onion tops and thus avoid the objection of surface ribs which have been used on rolls for that purpose and which cause the cutting and bruising of the onions.

While I have described the preferred embodiment of my invention it will be evident to those skilled in the art, that changes in the form and details of construction may be varied without departing from my invention.

I claim:

1. In a machine for topping onions, a trough, a plurality of cleaning and feeding bars forming the bottom of said trough and having their upper edges stepped to form shoulders, a crank-shaft on which the receiving ends of said bars are mounted for vertical and reciprocating movements, a fixed support on which the delivering ends of said bars are adapted to have sliding movements, a plurality of topping rolls, one of each pair having spiral grooves and located at the junction of said bars and the topping rolls for causing the grooved and ungrooved rolls to rotate in opposite directions in pairs and means for operating the crank-shaft, the said rolls forming a continuation of the hopper bottom and upon which the onions are delivered from the feeding and cleaning bars.

2. In a machine for topping onions, a frame, a hopper mounted in said frame, a plurality of cleaning and feeding bars forming the bottom of said hopper, a plurality of topping rolls at a lower level, one of each pair having spiral grooves and forming a longitudinal continuation of the hopper bottom, means for causing the rolls to rotate in opposite directions in pairs, and means suitably mounted on the machine for reciprocating the cleaning and feeding bars, and means for delivering the onions from the latter upon the topping rolls, whereby the cleaning, feeding and topping operations are rendered successive and continuous within the same hopper.

3. In a machine for topping onions, a frame, a hopper mounted in said frame, a plurality of cleaning and feeding bars forming the bottom of said hopper, a plurality of topping rolls arranged at a lower level and forming a longitudinal continuation of the hopper-bottom and one of each pair having spiral grooves, and a fixed plate at the delivery ends of the bars and overhanging the receiving ends of the rolls, means located beneath said plate and thereby protected from the falling onions for causing the rolls to rotate in opposite directions in pairs, and means located on the machine for reciprocating the cleaning and feeding bars, whereby the treatment of the onions on the bars and on the rolls is rendered successive and continuous.

4. In a machine of the character described and in combination, a hopper forming frame, a plurality of cleaning and feeding bars forming the bottom of said hopper and having shoulders at their upper edges, a shaft having a plurality of cranks on each of which one end of each bar is mounted, a fixed support for the delivery ends of said bars, in combination with a plurality of pairs of rolls mounted within said hopper-frame to rotate in opposite directions in pairs, one of said pair having spiral grooves of greater width than depth each groove forming a pair of surface edges which co-act with the non grooved roll to pull off the onion tops, means for causing the rolls to rotate in opposite directions in pairs, and means located at the junction of the said bars and the topping rolls for operating the crank-shaft.

In testimony whereof I have signed my name to this specification in the presence of two subscribing witnesses.

PETER JANSEN.

Witnesses:
O. K. MORTON.
C. N. MORTON.